United States Patent
Parsons et al.

(10) Patent No.: US 9,828,764 B2
(45) Date of Patent: Nov. 28, 2017

(54) METHOD TO REDUCE AIR INFILTRATION THROUGH AN INSULATED FRAME STRUCTURE

(71) Applicant: DOW GLOBAL TECHNOLOGIES LLC, Midland, MI (US)

(72) Inventors: Gary D. Parsons, Midland, MI (US); Michael D. Bowe, Doylestown, PA (US); Janah C. Szewczyk, Philadelphia, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/103,466

(22) PCT Filed: Dec. 12, 2014

(86) PCT No.: PCT/US2014/070019
§ 371 (c)(1),
(2) Date: Jun. 10, 2016

(87) PCT Pub. No.: WO2015/094969
PCT Pub. Date: Jun. 25, 2015

(65) Prior Publication Data
US 2016/0305119 A1 Oct. 20, 2016

Related U.S. Application Data

(60) Provisional application No. 61/918,510, filed on Dec. 19, 2013.

(51) Int. Cl.
*E04B 1/76* (2006.01)
*D04H 13/00* (2006.01)
(Continued)

(52) U.S. Cl.
CPC .............. *E04B 1/7604* (2013.01); *B32B 5/18* (2013.01); *B32B 27/06* (2013.01); *D04H 13/00* (2013.01);
(Continued)

(58) Field of Classification Search
CPC ........ E04B 1/7604; E04B 1/78; E04B 1/7662; E04B 1/7675; E04B 5/02; E04B 1/7658;
(Continued)

(56) References Cited

U.S. PATENT DOCUMENTS 2,179,678 A * 11/1939 Wenzel ................. E04B 1/7604
52/407.3
2,780,090 A 5/1957 Rasmussen
(Continued)

FOREIGN PATENT DOCUMENTS

JP 1995-233569 A 9/1995
JP 2005-126948 A 5/2005

*Primary Examiner* — Jeanette E Chapman (57) ABSTRACT

Air flow is reduced through a structure insulated with one more layers of fiber wool or particulate insulating material. A layer of a foamed fluid polymeric composition is applied onto the exposed surface of the insulation to cover the edges at which the exposed surface of the insulation meets an enclosing member of the structure. The layer is then cured to form a polymeric coating on the exposed surface of the insulation. The coating seals the edge or edges at which the exposed surface of the insulation meets the enclosing members of the structure.

14 Claims, 2 Drawing Sheets

(51) Int. Cl.
  *E04B 5/02* (2006.01)
  *E04B 1/78* (2006.01)
  *B32B 5/18* (2006.01)
  *B32B 27/06* (2006.01)
(52) U.S. Cl.
  CPC .......... *E04B 1/7658* (2013.01); *E04B 1/7662* (2013.01); *E04B 1/7675* (2013.01); *E04B 1/78* (2013.01); *E04B 5/02* (2013.01); *B32B 2419/04* (2013.01); *B32B 2419/06* (2013.01); *E04B 2001/7679* (2013.01)
(58) Field of Classification Search
  CPC ... E04B 2001/7679; B32B 5/18; B32B 27/06; B32B 2419/06; B32B 2419/04; D04H 13/00
  See application file for complete search history.

(56) References Cited

U.S. PATENT DOCUMENTS

| | | | |
|---|---|---|---|
| 3,619,437 A | | 11/1971 | McDonald |
| 3,748,217 A * | | 7/1973 | May et al. ............ D06M 17/00 156/78 |
| 4,236,361 A | | 12/1980 | Boden |
| 4,776,142 A * | | 10/1988 | Hardesty ................ B32B 15/14 428/328 |
| 6,000,437 A * | | 12/1999 | Ponder ................. F16L 59/026 138/128 |
| 6,231,927 B1 * | | 5/2001 | Ruid ....................... B05D 1/42 118/123 |
| 6,333,365 B1 | | 12/2001 | Lucas |
| 6,812,313 B2 * | | 11/2004 | La Fleur ................ C08L 63/00 525/107 |
| 8,151,538 B2 | | 4/2012 | Bowe |
| 2004/0132375 A1 | | 7/2004 | Fukuhara |
| 2004/0148889 A1 | | 8/2004 | Bibee |
| 2009/0107611 A1 | | 4/2009 | Bowe |
| 2010/0175810 A1 | | 7/2010 | Korwin-Edson |
| 2010/0282632 A1 | | 11/2010 | Schabel |
| 2012/0237704 A1 * | | 9/2012 | Bowen, III ........ C08G 59/5006 428/35.5 |

\* cited by examiner

METHOD TO REDUCE AIR INFILTRATION THROUGH AN INSULATED FRAME STRUCTURE

The present invention relates to a method for reducing air infiltration in an insulated frame construction.

Frame construction is ubiquitous in housing and small-to-medium sized commercial buildings. In frame construction, a series of stick members are arranged approximately in parallel. They are normally held in this arrangement by virtue of being affixed to headers which are usually located at either end of the stick members. The stick members are usually called "studs" in the case of a wall or other vertical assembly. In that case, the headers are often referred to as "wall plates". For horizontal assemblies such as ceilings and floors, the stick members and headers are usually referred to as "joists" and "bandboards". The stick members in roof assemblies are commonly known as "rafters".

These frames are formed into walls, ceilings, floors and roofs, etc., by applying some sort of panel material to one or both sides of the stick members. The panel material may be, for example, an exterior sheathing material such as plywood, oriented strand board and the like, an insulating material such as a polymeric foam board, a wall board such as a gypsum wall board, a wood panel, or other material. In the case of a wall, the most common practice is to apply a panel to both sides of the frame. For example, an exterior wall typically will have an exterior sheathing material affixed to the exterior surface, and a wall panel of some type affixed to the interior side. A frame ceiling may have a panel affixed to it only on one side, especially if it is a top floor of the construction below an attic space. Roofs normally are paneled on one side with a variety of roofing materials.

The space between the stick members is typically on the order of 20 to 60 cm. The stick members themselves are typically 8 to 25 cm thick (i.e., from one side of the frame to the other). Therefore, once a wall panel is attached to one side of the frame, a number of spaces become created between the adjacent stick members. These are usually partially or entirely filled with an insulation material.

The insulation is frequently a fiber wool or a particulate material such as cellulosic insulation. The exposed (at the time of installation) surface of insulation of these types is uneven and porous, due to the fibrous nature of the fiber wool and the particulate and usually porous nature of cellulosic insulation. The thickness of the insulation layer is often not uniform, and in some cases the thickness can vary considerably.

The insulation layer by itself is not sufficient to stop air leakage. Air can pass through small cracks and openings in the structure. These might be, for example, cracks between adjacent panels of the sheathing, cracks between adjacent members of the frame structure, pass-throughs for HVAC, plumbing, venting or electrical wiring, or openings for electrical fixtures or other utility features. In the case of a ceiling beneath an attic space, there is a natural tendency for air to rise upward toward the attic. The air therefore tends to exert an upward force against a ceiling below the attic. This force increases the rate of air flow, and therefore heat loss, through the ceiling.

Air flow can be reduced easily in new frame constructions by diligently sealing these cracks and openings before installing the insulation. However, in older buildings, this sealing may have been done poorly or not at all. Even if a ceiling had been adequately sealed during construction, gaps can appear over time due the wear or failure of sealing materials, modifications to the structure, settling, weathering or weather-related damage, or many other reasons. Retrofitting the ceiling to resolve these problems requires removal and replacement of the insulation, which is expensive, dirty and creates a disposal problem.

What is desired is a way to reduce air leakage through a frame construction insulated with a fiber batt or particulate insulation material.

This invention is a process for reducing air flow through a structure insulated with one or more layers of fiber wool or particulate insulating material, the layers of fiber wool or particulate insulating material having an exposed surface and edges at which the exposed surface of the insulating material meets an enclosing member of the structure, comprising a) applying a layer of a foamed fluid polymeric composition onto the exposed surface of the insulation to cover the edges at which the exposed surface of the insulation meets an enclosing member of the structure and then;

b) curing the applied layer of foamed fluid polymeric composition to form a polymeric coating on the exposed surface of the insulation, which coating seals the edge or edges at which the exposed surface of the insulation meets the enclosing members of the structure.

This process is an effective and inexpensive way to reduce air permeation though an insulated structure. It is especially applicable to reducing air permeation through insulated frame assemblies. Surprisingly, a thin applied layer of polymeric coating provides for a very substantial reduction in air flow through the insulated assembly. Despite the uneven and porous nature of the insulation surface, a polymer layer forms which is both thin yet an effective barrier to the passage of air. The ability to form an effective air barrier which is nonetheless quite thin is a significant benefit of the invention. Thin polymer layers require less material, which minimizes costs. A thin, lightweight layer also does not compress the insulation significantly, and so has minimal effect on the thermal insulation value of the insulation material. The presence of the polymer layer helps to maximize the performance of the thermal insulation.

By applying the polymeric composition as a foamed fluid, there is minimal drainage of the polymeric composition into the insulation prior to cure. The foamed fluid polymeric composition can be applied even to vertical frame structures. Its foamed nature helps it to resist sagging or slumping off a vertical structure under its own weight.

Figure 1:
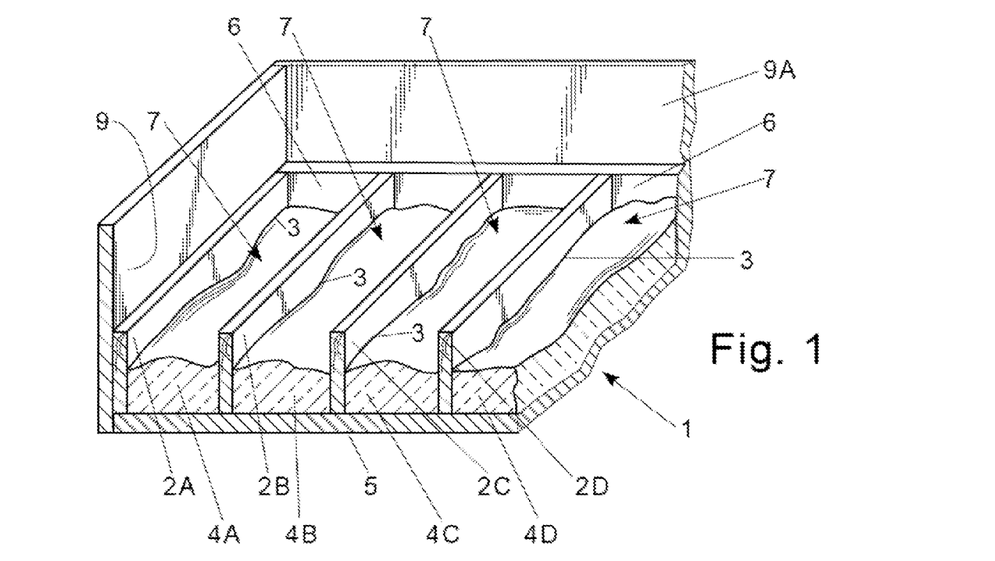
FIG. 1 is a cross-sectional view of a portion of an illustrative insulated frame assembly.

In FIG. 1, an insulated frame assembly generally indicated as 1 is made up of multiple stick members (in this cases, joists) 2A, 2B, 2C and 2D and panel 5 which, in the embodiment shown, forms a lower horizontal surface. The frame assembly shown in FIG. 1 is typical, for example, of frame ceilings below an attic space. Together with panel 5, each successive pair of stick members 2A, 2B, 2C and 2D defines a space which is partially filled with insulation layers 4A, 4B, 4C and 4D. Bandboard 6 defines the rear (as shown) end of the frame assembly and, correspondingly, the rear terminus of the spaces defined by the successive pairs of stick members 2A, 2B, 2C and 2D and panel 5. Another bandboard or other structural member (not shown) defines the forward terminus of those spaces. In this embodiment, the successive pairs of stick members, bandboard 6 and the unshown structural member at the forward terminus of the frame assembly form the enclosing members of each of insulation layers 4A, 4B, 4C and 4D. As shown, optional frame components 9 and 9A are affixed to stick member 2A and bandboard 6, respectively, and extend upwardly above the height of the stick members and bandboard 6. Optional frame components 9 and 9A are merely illustrative of many possible additional frame members which might be constructed above the level of stick members 2A and bandboard 6. Other types of those frame members might be, for example, a wall structure, a roof structure, and the like.

In the embodiment shown in FIG. 1, the thickness of insulation layers 4A, 4B, 4C and 4D is in each case less than the height of stick members 2A, 2B, 2C and 2D. The exposed surfaces 7 of insulation layers 4A, 4B, 4C and 4D therefore meet the adjacent stick members and bandboard 6 at edges (such as edges 3) about the periphery of each of insulation layers 4A, 4B, 4C and 4D. An "exposed" surface of the insulation layer is one which, prior to the introduction of a coating layer as described herein, is open to the atmosphere.

The insulation can be a fiber wool or particulate type. Fiber wool typically contains short (less than 150 mm) fibers that typically are entangled or lightly bonded, but may be fused, needle-punched, woven or knitted. The fibers may be, for example, glass, mineral wool or other ceramic and polymeric fibers such as various polyesters as described in U.S. Pat. No. 5,723,209, US 2004/0132375 and WO 2008/012680. Fiber wool can be provided in the form of blankets or batts, or can be loose fill that is blown into place. Particulate insulation material includes, for example, cellulosic insulation (which may be dry, wet-spray, stabilized and/or low dust types), foamed polymer particles, and the like.

Figure 2:
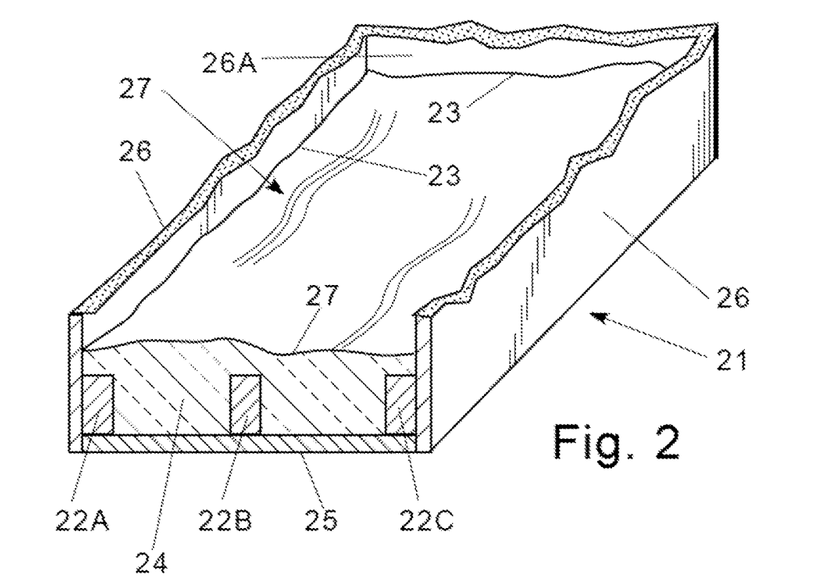
FIG. 2 is a cross-sectional view of a portion of a second illustrative insulated frame assembly.

The embodiment shown in FIG. 2 differs from that of FIG. 1 primarily with regard to the height the insulation relative to the height of the stick members. In FIG. 2, an insulated frame assembly generally indicated as 21 is made up of multiple stick members (in this case, joists) 22A, 22B and 22C and panel 25 which, in the embodiment shown, forms a lower horizontal surface. Vertical panels 26 are affixed to stick members 22A and 22C, respectively and another vertical panel 26A defines the rear (as shown) end of the frame assembly. Another panel, bandboard or other structural member (not shown) defines the forward terminus of the frame assembly. Panels 26 and 26A extend above the height of stick members 22A, 22B and 22C. In the embodiment shown in FIG. 2, insulation 24 fills the space defined by panels 25, 26 and 26A, extending above the height of stick members 22A, 22B, and 22C. Insulation 24 has exposed top surface 27 which meets panels 26 and 26A at edges 23. In FIG. 2, panels 26 and 26A, together with the unshown section of bandboard or other panel at the forward terminus of the frame assembly, constitute the enclosing members of the frame assembly.

FIGS. 1 and 2 each represent illustrative embodiments of insulated frame assemblies which are treated in accordance with the invention to reduce air flow.

According to the invention, a layer of a foamed fluid polymeric composition is applied onto the exposed surface (reference numerals 7 and 27 in FIGS. 1 and 2, respectively) of the insulation (4, 24 in FIGS. 1 and 2) to cover the edges (3, 23 in FIGS. 1 and 2) at which the exposed surface of the insulation meets an enclosing member of the structure. This layer (10, 29 in FIGS. 1A and 2A, respectively) is then cured to form a polymeric coating on the exposed surface of the insulation. The coating seals the edge or edges at which the exposed surface of the insulation meets the enclosing members of the structure.

Figure 1A:
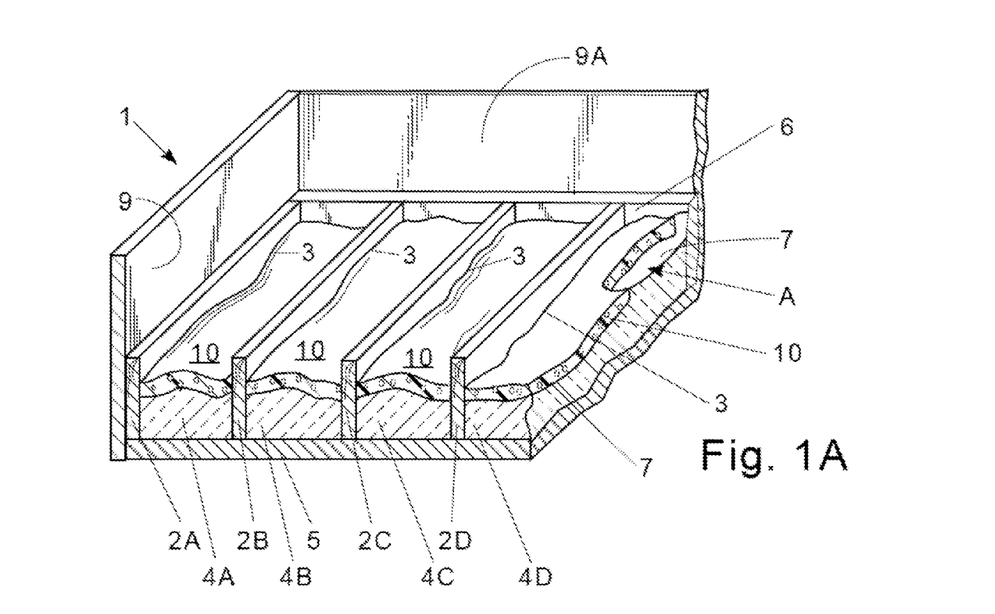
FIG. 1A is a cross-sectional view of a portion of the insulated frame assembly of FIG. 1 after application of a polymeric coating in accordance with the invention.
Figure 2A:
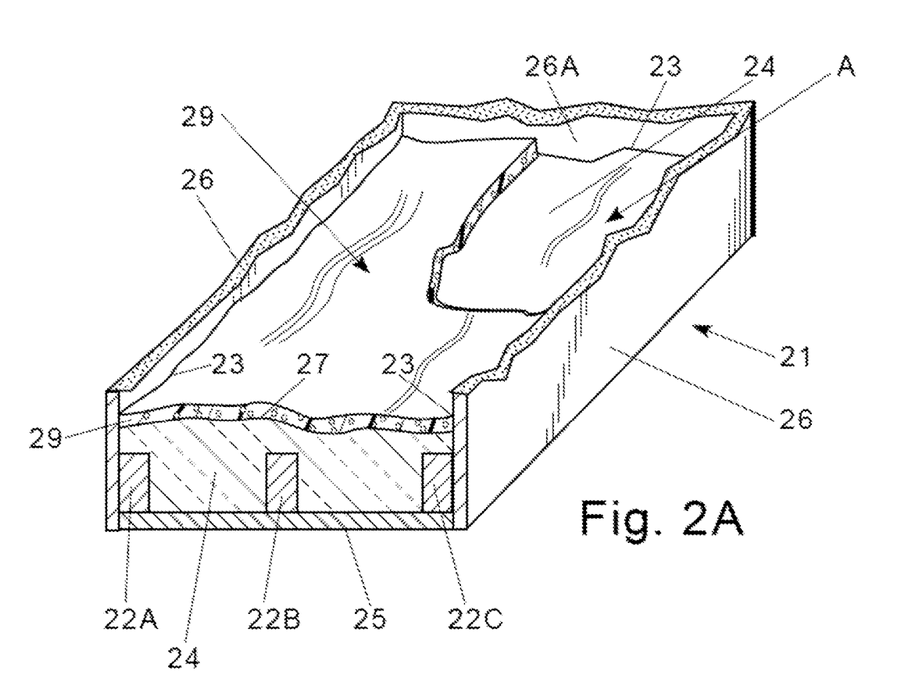
FIG. 2A is a cross-sectional view of a portion of the insulated frame assembly of FIG. 2 after application of a polymeric coating in accordance with the invention.

The embodiments shown in FIGS. 1A and 2A are preferred embodiments in which the coating also covers the entire exposed insulation surface. Although it is possible to leave a portion of the exposed insulation surface uncoated, a coating layer over the entire exposed surface of the insulation reduces air flow through the insulation, which improves thermal performance.

Thus, referring to FIGS. 2 and 2A, the foamed fluid polymeric composition is to be applied to exposed surface 27 of insulation layer 24 and along edges 23 (and all other edges) of insulation layer 27. Upon curing, a polymeric coating is produced on top of insulation layer 24. This polymeric coating seals the edges where exposed surface 27 of insulation layer 24 meets panels 26 and 26A (and the edge where exposed surface 27 meets the unseen frame member that defines the forward terminus of the frame assembly).

For purposes of this invention, any structure that penetrates the exposed of the insulation layer is an "enclosing member", and the edge formed where such structure meets the exposed surface of the insulation layer should be sealed as described herein. Thus, for example, the foamed fluid polymeric composition should be applied along edges where plumbing, venting, electrical, HVAC and other structures penetrate the exposed surface of the insulation layer, and cured to form a seal along such edges.

By "sealing" an edge, it is meant to form a physical barrier to the passage of gas between the foam insulation layer and adjacent enclosing structure by applying the foamed fluid polymeric composition to the edge and curing it. As mentioned above, it is preferred to coat the entire exposed surface of the insulation.

The foamed fluid polymeric composition is characterized in that (a) it has entrained gas which reduces the volume density of the composition to below that of its polymeric or polymer precursor components, (b) prior to curing, it flows as a liquid and therefore can be pumped and/or sprayed as a liquid and (c) it contains one or more polymers or one or more polymer precursors that, after curing as described below, forms the polymer.

In some embodiments, the polymer coating is a flexible material. Flexibility in the polymer coating provides advantages in durability. A flexible polymeric coating, for example, is less prone to cracking with small movements of the construction and/or the underlying insulation layer, or upon the application of a force onto the polymeric coating. Flexibility typically correlates with the glass transition temperature of the coating, with a glass transition temperature below room temperature typically correlating to increased flexibility. Flexibility also tends to correlate with elongation, with higher elongations correlating to greater flexibility.

Therefore, in some embodiments, the polymeric coating has at least one glass transition temperature ($T_g$) of 15° C. or less. It preferably has at least one glass transition temperature of 0° C. or less and more preferably has a glass transition temperature of −20° C. or less. This glass transition temperature may be as low as −120° C. In some cases, such as when the polymer is an acrylate polymer or copolymer, selecting a polymeric coating having at least one $T_g$ of 15° C. or lower may also significantly improve the ability of the coating to reduce air flow through the structure.

The polymeric coating in some embodiments has an elongation at break of at least 25%, at least 50%, at least 100% or at least 200%.

Examples of useful polymers include, for example, polymers of acrylic esters such as $C_1$-$C_8$ alkyl acrylates and hydroxyalkylacrylates, acrylate-styrene copolymers, acrylate-vinyl acetate copolymers, polyurethanes, polymers and copolymers of diene monomers such as butadiene, various silicone rubbers and the like, in each case having a $T_g$ as described above.

In some embodiments, the fluid polymeric composition is a dispersion of polymer particles in a fluid continuous phase, i.e., a latex. The fluid continuous phase preferably is aqueous, by which it is meant the continuous phase preferably is at least 75% by weight water. If desired, the polymer particles can be dispersed in various organic fluids, but this is less preferred because of potential odor, inhalation or exposure issues. The dispersion may include one or more surfactants that stabilize the dispersed polymer particles in the fluid continuous phase to reduce agglomeration and settling. Examples of dispersions of this type include acrylic emulsions, styrene-acrylic emulsions, vinyl acetate-acrylic emulsions, polyurethane emulsions, rubber (synthetic or natural) emulsions, and the like. Useful dispersions are commercially available. Examples include Rhoplex™EC-1791 acrylic emulsion, Rhoplex™ 2019RX styrene-acrylic emulsion, each available from The Dow Chemical Company, and Bayderm Finish 91UD, available from Bayer Material Sciences.

In other embodiments, the fluid polymeric composition is a solution of one or more polymeric materials in a suitable solvent.

In other embodiments, the fluid polymeric composition contains one or more precursor materials that react after application to form a polymer as described above. Examples of polymeric compositions of this type are curable one-part or two part polyurethane products. A one-part polyurethane includes an isocyanate-terminated prepolymer which cures in the presence of ambient moisture. Another type of one-part polyurethane contains an isocyanate component and one or more isocyanate-reactive materials such as a polyol, which are formulated to cure under specific conditions, typically an elevated temperature. This can be done by, for example, blocking the isocyanate groups or using a latent, heat-activated catalyst. A two-part polyurethane includes a polyisocyanate component and a separate curative component, which are mixed prior to application. The separate curative component contains one or more isocyanate-reactive materials such as water, a polyol, a polyamine or an aminoalcohol.

The fluid polymeric composition is foamed. This can be done is several ways. One method is a frothing method. In a frothing method a gas is physically whipped in to the polymeric composition to entrain the gas. The gas is generally air, but can be any other gas which does not react undesirably with the other components of the polymeric composition.

A second method of foaming the polymeric composition is by including a volatile blowing agent. In this method, the blowing agent is mixed with the polymeric composition and expands the polymeric composition as it is applied to the insulation, or afterward. In some cases, a pressurized blowing agent/polymeric composition mixture is formed and then dispensed onto the insulation layer. The reduction in pressure is sufficient to allow the blowing agent to volatilize and foam the composition. The blowing agent may also act as a propellant which forces the polymeric composition out of its pressurized container and through the application apparatus (typically through a sprayhead). The boiling temperature of the blowing agent in such a case should be approximately room temperature or below. Examples of suitable blowing agents of this type include hydrocarbons such as n-butane, i-butane and propane.

In a third method, a physical blowing agent having a boiling temperature above room temperature is incorporated into the polymeric composition. After application, the temperature of the polymeric composition is raised sufficiently to expand the blowing agent. The temperature can be raised by applying heat, through an exothermic reaction of one or more of the polymeric components, or otherwise.

In a fourth method, a chemical blowing agent is incorporated into the polymeric composition. The chemical blowing agent reacts or degrades as or after the polymer composition is applied to generate a gas. In the case of curable polyurethane precursors, a common chemical blowing agent is water, which reacts with isocyanate groups to generate carbon dioxide and also chain-extends the growing polymer chain and in that way participates in the cure.

Preferably, enough of the blowing agent is provided to produce a foam density of less than 0.25 g/cc, and more preferably 0.03 to 0.15 g/cc, after full expansion. The fluid polymeric foam composition in some cases may not be fully expanded upon application to the surface of the insulation. In such cases, further expansion can take place after it is applied.

In addition to the foregoing components, the fluid polymeric composition may contain various viscosity modifiers, drying agents, crosslinkers, curing agents, curing catalysts and/or accelerators, colorants, antioxidants, preservative, fillers, diluents and/or other additives as may be useful or desirable to form the coating layer and then effect the cure.

The foamed fluid polymeric composition is conveniently applied by spraying, although other methods such as pouring and troweling can be used. Conventional spraying equipment is entirely suitable. The fluid polymer composition can be dispensed as an aerosol, being packaged in a pressurized container and dispensed through a valve or sprayhead. The fluid polymer composition can be passed through a frothing device where it is mixed with air or other gas to form a froth which is then dispensed through a sprayhead or nozzle onto the surface of the insulation. When the blowing agent is a volatile liquid or a chemical blowing agent, the fluid polymeric composition can be dispensed through a sprayhead or nozzle as a liquid which foams after it is applied to the insulation. If necessary, components of the fluid polymeric composition can be brought to a mixhead where they are combined to form the fluid polymeric composition and then dispensed in a similar manner.

Spray foam dispensing apparatus is well known. One useful type of apparatus is a Froth-Pak foam sealant kit from The Dow Chemical Company.

In general, the foamed fluid polymeric composition is applied across the edges at which the exposed surface of the insulation meets the enclosing members, and bridges or fills gaps as may exist along such edges. In addition, enough of the polymeric composition may be applied to coat the exposed surface of the insulation layer. The applied layer of polymeric composition may be, for example, 0.25 to 25 cm thick after curing. A surprising advantage of the invention is that thin coatings are generally sufficient; therefore the applied layer preferably is no more than 5 cm thick and still more preferably no more than 2.5 cm thick after curing. The coating weight may be, for example, 100 to 2000 g/m², preferably 250 to 1200 g/m² and more preferably 350 to 1000 g/m².

Despite the porous and/or particulate nature of the insulation and the fluid nature of the polymeric composition, it has been found that the polymeric composition tends not to penetrate very far into the insulation layer. Instead, it is mainly retained at or near the surface of the insulation layer so, upon curing, a coating forms at or near that surface.

The applied foamed fluid polymeric composition is then cured. "Curing" here simply means that the coating of fluid polymeric composition converts to a solid polymer layer (which may be cellular). In the case of a polymer dispersion or solution, the curing mechanism may include a drying mechanism in which a continuous liquid phase evaporates or is otherwise removed, leaving a polymer layer behind. In the case of a polymer dispersion, the curing mechanism may include coalescing of the dispersed polymer particles. In the case of a polymer dispersion, the curing mechanism may optionally also include a reaction of the polymer during or after coalescing of the dispersed polymer particles. In the case of a reactive system which contains one or more polymer precursors, the curing mechanism will include a reaction of the precursor(s) to form the polymer.

FIGS. 1A and 2A illustrate the insulated frame assemblies of FIGS. 1 and 2, respectively, after application of the polymeric coating in accordance with the invention. Reference numerals in FIG. 1A refer, where applicable, to the corresponding reference numerals in FIG. 1. In FIG. 1A, polymeric coating 10 has been applied on top of exposed surface 7 of each of insulation layers 4A, 4B, 4C and 4D, in each case covering and sealing edges 3 where the exposed surface 7 of each insulation layer meets adjacent stick members 2A, 2B, 2C, 2D and bandboard 6. Cutaway A illustrates a section in which polymeric coating 10 is removed to reveal the underlying exposed surface 7 of one of the insulation layers 4.

In this embodiment, each of insulation layers 7 is coated separately due to the low height of the insulation layers 4A, 4B, 4C and 4D relative to the heights of stick members 2A, 2B, 2C and 2D. However, it is possible and even preferable to apply the polymeric coating onto the entire exposed surfaces of stick members such as stick members 2A, 2B, 2C and 2D, such that a continuous polymer layer is formed over the entire insulated structure.

In the embodiment shown in FIG. 2A, because the height of insulation layer exceeds that of stick members 22A, 22B and 22C, a single layer of polymeric coating 29 is applied across the entire frame assembly, sealing edges 23 where the exposed surface of insulation layer 24 meets the enclosing members (in this case, panels 26 and 26A).

The polymeric coating after curing may be cellular or non-cellular. Some or all of the cell structure of the foamable fluid polymeric composition may be lost as the foam cures. For example, the polymeric coating may form a skin on either or both surfaces upon curing. The polymeric coating after curing may maintain the same thickness as it had when originally applied. In other cases, it may expand to a greater thickness, or it may contract to a lesser thickness than it had when originally applied.

Another advantage of the invention is that the polymeric coating is often semi-permeable to water vapor while still providing an effective barrier to air flow through the structure. The polymeric coating in some embodiments has a permeability of 1 to 25 perms (57-1425 ng/s·m²·Pa), especially from 5 to 25 perms (285-1425 ng/s·m²·Pa).

Via the process of this invention, air flow through the insulated structure often is reduced by at least 30%. In some embodiments, the air flow can be reduced by at least 50%, at least 75%, at least 90%, at least 95%, at least 98%.

If desired one or more additional layers of thermal insulation material may be applied over the polymer coating. This additional thermal insulation material may be a fibrous or particulate insulation as described before, a rigid polymer foam board insulation, or other useful type.

The process of this invention can be applied to new construction or retrofits of existing constructions. In new constructions, the process of this invention can supplement or partially or entirely replace crack sealing between joints in the frame structure. In retrofits, this invention can avoid or reduce the need to remove existing insulation and seal cracks in the underlying frame structure, thereby avoiding the cost of removing and replacing the existing insulation.

The following examples are provided to illustrate the invention, not to limit the scope thereof. All parts and percentages are by weight unless otherwise indicated.

Examples 1 and 2

A 112×112×1.27 cm frame is constructed from plywood. A 40.6×40.6 cm square is cut though the center of the frame. A raised rim (5.1 cm in height) is constructed around the square opening. Two pieces of 1.27 cm plywood are mounted on the raised rim, leaving a 0.3 cm gap between them. The result is a 40.6×40.6×5.1 cm cavity backed with the two pieces of plywood. The assembly is then inverted and the 40.6×40.6 cm opening is covered with a 3 mil (0.76 mm) polyethylene film. The assembly is then mounted in an air flow apparatus with the film facing away from the vacuum. The pressure inside the air flow apparatus is reduced to 25 Pa below atmospheric pressure, and air flow is measured to obtain baseline air flow rates. The film prevents air from flowing through the gaps in the plywood and through the cavity, and so allows the air flow due to other leaks in the system to be measured and subtracted from subsequent measurements.

After the baseline testing, the polyethylene film is removed. Fiberglass batt is loosely fitted into the cavity. The assembly is mounted in the air flow apparatus as before, and airflow is measured. Air flow due to system leakage is removed from the result to calculate air flow through the insulated cavity.

Example 1: The cavity of the test assembly described above is loosely filled with fiberglass batt as described before. A commercially available two-part polyurethane spray foam insulation (Froth-Pak 200 kit from The Dow Chemical Company) is applied to the surface of the fiberglass batt by spraying a series of overlapping 1-2 cm beads of foam until the entire surface of the fiberglass batt is covered and the edges where the fiberglass batt meet the frame are sealed. The polyurethane is then cured at 22° C./50% relative humidity for 7 days. Air flow is then tested as described before, with results as in Table 1 below.

Examples 2 and 3: 2210 grams of an aqueous acrylic emulsion (55% solids, $T_g$ −40° C., Rhoplex™ EC-1791 from The Dow Chemical Company) is stirred gently without entraining air. 390 grams water, 5.2 grams of an anionic associative thickener (Acrysol™ DR-72, 30% solids, from The Dow Chemical Company), 26 grams of a 29.5% solution of sodium lauryl sulfate in water and 52 grams of a 35% solution of ammonium stearate in water are mixed in for about 10 minutes. The resulting mixture is allowed to sit overnight. Portions of the mixture are placed in separate aerosol cans. Valves are crimped on, and a mixture of isobutane and propane is charged through the values, in the following proportions:

Example 2: 527.9 g of the emulsion mixture, 17.5 g isobutane, 4 g propane. Approximate blowing agent content: 3.9% by weight.

Example 3: 517 g of the emulsion mixture, 26.8 g isobutane, 6.8 g propane. Approximate blowing agent content: 6.1% by weight.

Examples 2 and 3 are each sprayed onto the surface of a fiberglass batt-filled test assembly as described with respect to Example 1, and cured in the same manner. The approximate foam density as dispensed for Example 2 is 0.092 g/cc and that of Example 3 is about 0.055 g/cc. In each case, air flow is tested as described above, with results as indicated in Table 1.

Example 4: 1360 grams of an aqueous styrene-acrylic emulsion (55% solids, $T_g$ −7° C., Rhoplex™ 2019 RX from The Dow Chemical Company) is stirred gently without entraining air. 240 grams water, 3.2 grams of an anionic associative thickener (Acrysol™ DR-72, 30% solids, from The Dow Chemical Company), 16 grams of a 29.5% solution of sodium lauryl sulfate in water and 32 grams of a 35% solution of ammonium stearate in water are mixed in for about 10 minutes. 528.2 g of this mixture is packaged in an aluminum spray can as described with respect to Examples 2 and 3, and the can is pressurized with 17.3 g isobutane and 4.7 g propane. The approximate foam density as dispensed is about 0.099 g/cc. Air flow is tested as described before, with results as indicated in Table 1.

TABLE 1

| Designation | Polymer Description | Air Leakage, as % of Control |
|---|---|---|
| Control | No coating | 100% |
| Ex. 1 | Polyurethane | 1.8% |
| Ex. 2 | Acrylic, $T_g$ = −40 C., 3.9% blowing agent | 1.9% |
| Ex. 3 | Acrylic, $T_g$ = −40 C., 6.1% blowing agent | 13.9% |
| Ex. 4 | Styrene-acrylic, $T_g$ = −7 C. | 23.3% |

The foamed polymer layers are seen to reduce air flow very substantially. Among the latexes, lower $T_g$ is seen to correlate to better performance. In an additional experiment, Example 3 is repeated, replacing the styrene-acrylic latex with an acrylic latex having a $T_g$ of +17° C. Air flow increases to 56.7%, further establishing the correlation between lower $T_g$ and better performance with the styrene-acrylic latexes.

Examples 5-7

Example 5: A 175-g portion of the emulsion mixture described in Examples 2 and 3 is placed in a Hobart bakery mixer and whipped at high speed with a wire whisk attachment for five minutes to produce a froth having a density of 0.08 g/cc. In each case, this froth is then troweled onto a fiberglass-filled test assembly, cured and evaluated in the same manner as the previous examples.

Example 6: A 175-g portion of the emulsion mixture described in Example 4 is placed in a Hobart bakery mixer and whipped at high speed with a wire whisk attachment for five minutes to produce a froth having a density of 0.086 g/cc. This froth is then troweled onto a fiberglass-filled test assembly and cured and evaluated in the same manner as the previous examples.

Example 7: 203 grams of the Rhoplex™ EC-1791 emulsion described above and 202 grams of a second acrylic emulsion (50% solids, $T_g$ +27° C., Rhoplex™ AC-630 from The Dow Chemical Company) are stirred gently without entraining air. 240 grams water, 3.2 grams of an anionic associative thickener (Acrysol™ DR-72, 30% solids, from The Dow Chemical Company), 16 grams of a 29.5% solution of sodium lauryl sulfate in water and 32 grams of a 35% solution of ammonium stearate in water are mixed in for about 10 minutes. A froth having a density of 0.073 is formed as described with respect to Examples 5 and 6, and that froth is applied to the test frame assembly and cured as before.

Results of the testing of Examples 5-7 are as indicated in Table 2.

TABLE 2

| Designation | Polymer Description | Air Leakage, as % of Control |
|---|---|---|
| Control | No coating | 100% |
| Ex. 5 | Acrylic, $T_g$ = −40 C., 3.9% blowing agent | 67.1% |
| Ex. 6 | Styrene-acrylic, $T_g$ = −7 C. | 58.3% |
| Ex. 7 | Mixture of acrylics, $T_g$ = −40° C. and +27° C. | 79.8% |

The polymer layer in each case reduces air flow. However, these frothed systems do not perform as well as the aerosol systems described in Examples 1-4. When these examples are repeated using acrylic latexes having glass transition temperatures of +17° C., +18° C. and +27° C., air flow is reduced only slightly, indicating a poorer performance of the higher glass transition, less elastomeric acrylate latex materials in this frothed system.

Examples 8-14

Emulsion mixtures are made from the Rhoplex™ 2019 RX product described before by mixing it with additional ingredients as indicated in Table 3:

TABLE 3

| | Parts By Weight | | | | | | |
|---|---|---|---|---|---|---|---|
| Ingredient | Ex. 8 | Ex. 9 | Ex. 10 | Ex. 11 | Ex. 12 | Ex. 13 | Ex. 14 |
| Rhoplex 2019 RX | 637.5 | 562.5 | 562.5 | 637.5 | 637.5 | 637.5 | 637.5 |
| Water | 112.5 | 187.5 | 187.5 | 112.5 | 75 | 112.5 | 112.5 |
| Associative Thickener | 1.5 | 1.5 | 3.75 | 1.5 | 1.5 | 1.5 | 1.5 |
| 29.5% Sodium lauryl sulfate solution | 7.5 | 7.5 | 7.5 | 7.5 | 7.5 | 7.5 | 7.5 |
| 35% ammonium stearate solution | 7.5 | 15 | 15 | 15 | 15 | 15 | 15 |

TABLE 3-continued

| Ingredient | Parts By Weight | | | | | | |
|---|---|---|---|---|---|---|---|
| | Ex. 8 | Ex. 9 | Ex. 10 | Ex. 11 | Ex. 12 | Ex. 13 | Ex. 14 |
| Ethanol | 0 | 0 | 0 | 0 | 37.5 | 0 | 0 |
| Triton ™ X-405 | 0 | 0 | 0 | 0 | 0 | 7.5 | 0 |
| 40% sodium xylene sulfonate solution | 0 | 0 | 0 | 0 | 0 | 0 | 3.75 |

The resulting emulsion mixtures are packaged in aluminum spray cans as described with respect to Examples 2 and 3, and the cans are pressurized with blowing agent. The amount and type of blowing agent is as indicated in Table 4. After blowing agent addition, the cans are overpressurized to about 360 kPa (52 psi) gauge with nitrogen. The approximate foam density as dispensed is measured in each case. Each is applied to the fiberglass-filled test assembly and cured as in previous examples. Air flow is tested as described before. The dispensed density and air flow results are as indicated in Table 4.

TABLE 4

| Ingredient | Ex. 8 | Ex. 9 | Ex. 10 | Ex. 11 | Ex. 12 | Ex. 13 | Ex. 14 |
|---|---|---|---|---|---|---|---|
| | Parts by Weight | | | | | | |
| Emulsion Mixture | 575.9 | 576.5 | 573.5 | 576.5 | 576.2 | 576.0 | 576.8 |
| Isobutane | 19.6 | 16.5 | 16.9 | 17.3 | 16.5 | 16.7 | 16.2 |
| Propane | 10.2 | 7.2 | 7.9 | 3.1 | 9.0 | 8.2 | 8.0 |
| Dimethyl ether | 0 | 0 | 0 | 5.1 | 0 | 0 | 0 |
| As dispensed foam density, g/cc | 0.085 | 0.119 | 0.118 | 0.117 | 0.119 | 0.119 | 0.073 |
| Air leakage rates, as % of control | 50.5 | 36.8 | 7.3 | 11.0 | 13.7 | 45.0 | 41.8 |

This data shows the effect of modifications to a formulation based on a styrene-acrylic emulsion having a $T_g$ of −7° C. Reducing the amount of foam stabilizer increases the air leakage rate (Ex. 8 vs. Ex. 3, Table 1), as does greater dilution of the polymer solids (Ex. 9 vs. Ex. 3) and increasing the amount of surfactant (Ex. 13 and 14). All examples provide significant reduction in air leakage.

Example 10 is repeated, except the amount of blowing agent is increased to 5% based on the weight of the emulsion. The applied fresh foam layer about 0.8 cm thick (480 g/m² area density). Air leakage rates in duplicate tests are 38% and 54% of control.

When emulsion mixture Ex. 10 is whipped with air and evaluated as described in Examples 5-7, the air leakage is 30.9% of the control.

Example 15

The emulsion mixture described in Example 3 is packaged in an aluminum spray can as described with respect to Examples 2 and 3, and the cans are pressurized with a blend of isobutane, propane and dimethyl ether in a 68:12:20 weight ratio. The blowing agent content is 5% by weight. The emulsion mixture is sprayed to a vertical test assembly. The test assembly is identical to the one described above. The cavity is filled with fiberglass batt as before, and the frame is held vertically as the foamed polymeric composition is sprayed and cured. When 140 g of the emulsion (corresponding to a coverage rate of 700 g/m²) is applied to the fiberglass batt and cured as before, the air leakage rate is 64% of the control. When the amount of emulsion is increased to 215 g, the air leakage rate is 29% of the control. These experiments demonstrate that the invention is useful even in vertical applications.

To evaluate water vapor permeability of the coating layer, fiberglass wool is packed loosely in a 500 cc cup 9 cm in diameter, leaving an unfilled space 2 cm deep at the top. A layer of the foamed emulsion about 2.5 cm thick is applied to the top of the fiberglass. The applied layer extends slightly above the rim of the cup. The foam is dried 9 days until a constant weight is achieved. 15 cc of water is injected into the cup through a small hole about 7 cm from the bottom, and the hole is sealed. The cup is stored under constant temperature and relative humidity, daily linear weight loss is measured, and permeability in perms is calculated according to ASTM E96, method B. The foam layer has a permeability of 9.5 perms.

Example 16

An emulsion mixture is prepared and packaged with blowing agent as described in Example 15. This mixture is applied to the top surface of the insulation layer in a horizontal insulated frame assembly as described before, except the fiberglass batt in this case is replaced with loose cellulose particulate insulation. The test is performed three times with different foam coating weights. The coated assemblies are cured and air flow tested as described before.

At a coating weight of 150 g, the air leakage is 25% of the control. At a coating weight of 190 g, the air leakage is 20% of control. When the coating weight is increased to 230 g, the air leakage rate falls to 5% of control. These experiments demonstrate the ability to reduce air leakage through loose-fill cellulosic insulation.

Example 17

427.5 g of a 40% solids polyurethane dispersion (Bayderm Finish 91 UD, glass transition temperature −40°) is blended with 22.5 g water, 0.45 g of the Acrysol™ DR-72 associative thickener, 4.5 g of a 29.5% solids sodium lauryl sulfate solution and 9 g of a 35% solids ammonium stearate solution. A 175-g portion of this mixture is placed in a Hobart bakery mixer and whipped at high speed with a wire whisk attachment for five minutes to produce a froth having a density of 0.093 g/cc. This froth is then troweled onto a fiberglass-filled test assembly, cured and evaluated in the same manner as the previous examples. The air leakage is 3% of the control.

What is claimed is:

1. A process for reducing air flow through a structure insulated with one or more layers of fiber wool or particulate insulating material, the layers of fiber wool or particulate insulating material having an exposed surface and edges at which the exposed surface of the fiber wool or particulate insulating material meets an enclosing member of the structure, comprising
    a) applying a layer of a foamed fluid polymeric composition that contains at least one volatile blowing agent onto the exposed surface of the fiber wool or particulate insulating material to cover the edges at which the exposed surface of the fiber wool or particulate insulating material meets an enclosing member of the structure and then;
    b) curing the applied layer of foamed fluid polymeric composition to form a polymeric coating on the exposed surface of the fiber wool or particulate insulating material, which coating seals the edge or edges at which the exposed surface of the fiber wool or particulate insulating material meets the enclosing members of the structure, wherein the polymeric coating has at least one glass transition temperature of 15° C. or less, wherein the air flow through the structure is reduced by at least 50% after application of the polymeric coating.

2. The process of claim 1, wherein the polymeric coating covers substantially the entire exposed surface of the fiber wool or particulate insulating material.

3. The process of claim 1, wherein the air flow through the structure is reduced by at least 75% after application of the polymeric coating.

4. The process of claim 1, wherein the thickness of the polymeric coating is 0.25 to 5 cm.

5. The process of claim 1, wherein the structure is a ceiling or horizontal structure.

6. The process of claim 1 wherein the structure is a vertical structure.

7. The process of claim 1, wherein the fiber wool or particulate insulating material is a fiber batt or cellulose insulation.

8. The process of claim 1 wherein the polymeric coating has an elongation to break of at least 50%.

9. The process of claim 1 wherein the polymer is one or more of a $C_1$-$C_8$ alkyl acrylate, a polymer of a hydroxyalkylacrylate, an acrylate-styrene copolymer, an acrylate-vinyl acetate copolymer, a polyurethane, a polymer or copolymer of a diene monomers, or a silicone rubber.

10. The process of claim 1 wherein the fluid polymeric composition is a dispersion of particles of the polymer in a fluid continuous phase.

11. The process of claim 10 wherein the fluid polymeric composition is an aqueous emulsion.

12. The process of claim 1 wherein the fluid polymeric composition contains one or more precursor materials that react after application to form the polymer.

13. The process of claim 12 wherein the precursor materials include at least one polyisocyanate compound.

14. The process of claim 1 wherein the polymeric coating has a permeability of 285-1425 ng/s·m²·Pa.

* * * * *